United States Patent [19]
Nichols

[11] 4,223,465
[45] Sep. 23, 1980

[54] LURE RETRIEVER

[76] Inventor: John E. Nichols, Box 148, Vermilion, Alberta, Canada, T0B 4M0

[21] Appl. No.: 1,855

[22] Filed: Jan. 8, 1979

[51] Int. Cl.³ ............................................. A01K 97/00
[52] U.S. Cl. .................................. 43/17.2; 294/66 R
[58] Field of Search .......................... 43/17.2, 5, 27.2; 294/66 R, 110 A

[56] References Cited

U.S. PATENT DOCUMENTS

| | | | |
|---|---|---|---|
| 1,271,435 | 7/1918 | Cloutier | 294/66 R |
| 1,274,013 | 7/1918 | Dean | 294/110 A |
| 2,235,371 | 3/1941 | Jyrkas | 43/5 |
| 3,160,978 | 12/1964 | Corley | 43/17.2 |
| 3,574,967 | 4/1971 | Splawinski | 43/17.2 |
| 4,152,859 | 5/1979 | Hansen | 43/17.2 |

Primary Examiner—Nicholas P. Godici

[57] ABSTRACT

A fisherman's accessory, for retrieving a fishing hook snagged among weeds or other objects during fishing; the device including a generally inverted, U-shaped wire, having inwardly bent, hook-shaped ends, and a pair of semi-circular guides across its center, for grasping around the fishing line as it is lowered to the hook; the device, in one design, including spring means to snap outwardly.

1 Claim, 3 Drawing Figures

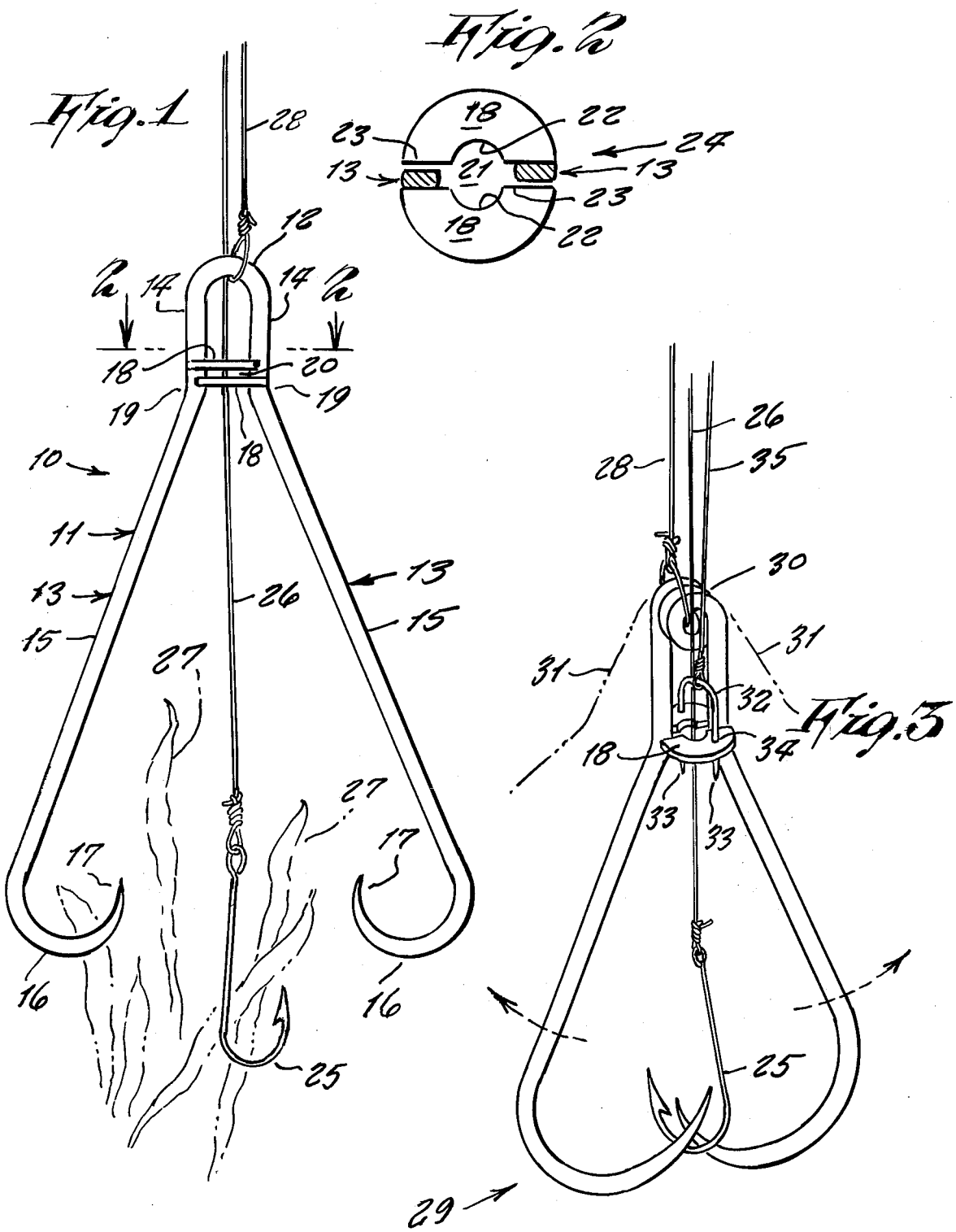

LURE RETRIEVER

This invention relates generally to accessories for sports fishermen.

It is a common experience of many sports fishermen to lose their prized fishing lures when a fishing hook gets snagged in thick weeds, or gets hooked on debris or other underwater objects, so that the line must be cut, and the lure lost. This situation is objectionable, and is, therefore, in want of an improvement.

Accordingly, it is a principal object of the present invention to provide a fishing lure retriever, that can be sent down a fishing line of a snagged hook, so as to free the same, in order that the lure can be retrieved.

Another object is to provide a lure retriever, that is quickly and readily installed or removed from a fishing line, as needed.

Still another object is to provide an improved lure retriever, which has been proven superior in use to other retrieving devices used heretofore, and which, in one design of the invention, includes a snapping action, for spreading weeds away from a captured hook.

Other objects are to provide an improved lure retriever, which is simple in design, inexpensive to manufacture, rugged in construction, easy to use and efficient in operation.

These, and other objects, will be readily evident, upon a study of the following specification, and the accompanying drawing, wherein:

FIG. 1 is a side elevation view of the lure retriever, installed on a fishing line, and lowered down around a hook that is snagged in weeds;

FIG. 2 is an enlarged cross-sectional view, taken on line 2—2 of FIG. 1;

FIG. 3 is a perspective view of a modified design of the invention, and which includes a snapping action for freeing a snagged hook.

Referring now to the drawing in greater detail, the reference numeral 10, in FIGS. 1 and 2, represents an improved lure retriever, according to the present invention wherein there is shown a stiff wire, metal member 11, that, at its center, has a one hundred eighty degree, rounded bend 12, so as to form a pair of legs 13, each of which includes a short portion 14 adjacent the bend, the portions 14 being spaced apart, parallel to each other. A portion 15, adjacent the portion 14, extends angularly thereto, the portions diverting from each other. An outward end of each portion 15 is inwardly bent, so as to form a semi-circular hook 16, that tapers to its pointed tip 17. The hooks 16 are positioned so as to face each other.

A semi-circular plate 18 is welded near a bend 19 of each leg 13, the plates being parallel to each other, and being spaced apart, so that a space 20 is between the flat planes of the plates. The plates are positioned so that, together, they form a generally circular assembly, when viewed in a direction 2—2 of FIG. 1, and a circular central opening 21 is thus formed, by a semi-circular notch 22 along a straight diametrical side 23 of each. The plates together form a guide 24.

In operative use, if a hook 25, on a fishing line 26, gets snagged in weeds 27, the retriever 10 is attached to a retriever line 28, and the retriever is then fitted on the fishing line 26, so that it passes through the opening 21. In this position, the retriever is then lowered into the water down to the snagged hook, where repeated pulling of the retriever line causes the retriever to rip up the weeds, so that the fishing hook 25 is thus freed, after which the retriever is pulled up and removed.

In FIG. 3, a modified design of improved fishing lure retriever 29 has its member 11 made of spring steel, and a rolled-up coil 30, of several turns, is made at its center, instead of only a semi-circular bend 12, the coil normally urging the legs 13 to be in a spread apart position, as indicated by dot-dash lines 31. The legs, however, are forcibly held together in the position shown by the solid lines, by means of a "U"-shaped clip 32, having parallel legs 33, which are inserted in a hole 34 in each plate 18, as shown. A pull line 35 is attached to the clip.

In operative use, when the retriever 29 is lowered on fishing line 26, as above described, and positioned near the snagged hook, the pull line 35 can be given a quick pull, thus pulling the clip free from the holes 34, so that the legs 13 suddenly snap outwardly, and tear weeds sidewardly away from the snagged hook, as an additional aid to free the hook.

While various changes may be made in the detail construction, it is understood that such changes will be within the spirit and scope of the present invention, as is defined by the appended claims.

I claim:

1. An improved lure retriever, comprising, in combination, a metal wire member bent at its center, so as to form two legs, each of which, at its end, is bent into a hook, said hooks facing each other, and a fishing line guide formed on said member, comprising a pair of axially spaced-apart, semi-circular plates, each having a semi-circular notch, which, together, form a circular opening for receiving said fishing line of a snagged hook, and said member being attached to a retriever line; each said semi-circular plate being affixed to one said leg, a rolled-up coil spring urging said legs apart, said legs being held forcibly together by a U-shaped clip attached to a pull line, said U-shaped clip including a pair of parallel legs, each of which is inserted in a hole in each said plate.

* * * * *